Patented Aug. 22, 1933

1,923,938

UNITED STATES PATENT OFFICE 1,923,938

OCTYL ALCOHOL ESTERS

Lucas P. Kyrides, St. Louis, Mo., assignor, by mesne assignments, to Monsanto Chemical Company, a Corporation of Delaware No Drawing. Application September 23, 1929
Serial No. 394,737

8 Claims. (Cl. 260—103)

My present invention relates to a new class of compositions, which are identified by the presence of the octyl radical beta ethyl hexyl as a characteristic constituent and to the use of octyl esters in the arts.

One object of the invention is to provide a novel class of compounds possessing valuable characteristics and potential industrial uses. A further object of the invention is to provide a new class of compositions not known heretofore which are typified by the presence of an octyl group. The invention likewise contemplates a novel class of compositions which when incorporated in resinous or plastic compositions, such as—oxycellulose, phenolaldehyde and "Glyptal" impart valuable properties.

I have found that octyl alcohol reacts with various aliphatic and aromatic acids to form esters having desirable plasticizing properties. A specific example of such an ester is the acetic ester of normal octyl alcohol. By reason of the fact that the betaethyl hexyl alcohol

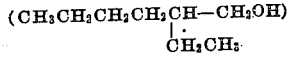
(CH₃CH₂CH₂CH₂CH—CH₂OH)
             |
             CH₂CH₃ is more easily obtainable (see Journal of the Chemical Society, volume 117, (1920), pages 324–333), as well as the fact that the esters themselves are peculiarly adapted for the plasticization of resinous and oxycellulose bodies, this octyl alcohol is preferred.

The esters may be prepared in the usual manner, as by causing the acid or its anhydride to react with a slight excess of the alcohol at elevated temperatures. Thus for the preparation of di-beta ethyl hexyl phthalate I heat 1 mol of phthalic anhydride with approximately 2.4 mols of beta ethyl hexyl alcohol at temperatures ranging from 130° to 180° C. for 10 hours. A stream of air may be employed advantageously for the purpose of removing the water as formed. The resulting mixture is washed with a sodium carbonate solution and thereafter distilled, the fraction boiling at approximately 210° C. at approximately 3 millimeters pressure being collected. The product is a liquid at ordinary temperatures, which is colorless, neutral, unaffected by actinic ray, stable towards atmospheric elements and has a boiling point which renders it suitable for the plasticization of nitrocellulose, acetyl cellulose, phenol aldehyde resin, "Glyptal" resin and analogous plastic or molded compositions.

In a manner analogous to that described above, the beta ethyl hexyl esters of the following acids may be prepared—acetic benzoic, maleic, fumaric, oxalic, lactic, abietic, tartaric and the fatty acids, including the low as well as the high boiling point members of this series. It is apparent, therefore, that the invention comprehends generally esters whether mixed or otherwise of an octyl alcohol, and an acid including the aliphatic as well as the aromatic, the monocarboxylic as well as the polycarboxylic, saturated as well as unsaturated acids. These materials may be employed as plasticizers or high boiling solvents in the manner well understood by those skilled in the art.

For the purpose of forming a film in which this plasticizer is incorporated I mix: 28.5 parts of wet nitrocellulose (consisting of 80% dry nitrocellulose, 20% alcohol) with 95 c. c. of solvent, 10 grams of plasticizer, and .2 of a gram of a stabilizer, such as urea. A typical solvent composition, which has been found satisfactory, and which produces a satisfactory film with the compositions described above, consists of: 10 c. c. benzene, 9 c. c. ethyl acetate, 10 c. c. grain alcohol (96%), 2 c. c. amyl acetate, 1 c. c. normal butyl alcohol. The ingredients making up the formula are mixed thoroughly to give a uniform composition, which may be deposited for evaporation upon a smooth surface to form a clear, tough, desirable, film product, having properties which are superior in many respects to a film formed with dibutyl phthalate. Obviously the proportions may be varied to meet the requirements of the ultimate product.

The compositions making up my invention may advantageously be employed in the manufacture of resinous bodies, such as—phenol aldehyde reaction products or "Glyptal." For this purpose, the phenol and aldehyde materials are caused to react initially in the usual manner. While still in a fusible, molten state the ester is added in amounts ranging from 3 to 30% by weight. The resulting mixture is agitated at an elevated temperature until the ester is uniformly distributed throughout the mass. The product thus formed may be rendered infusible in the usual manner.

Although I have described representative compounds which characterize my invention, it will be apparent that other esters not specifically enumerated are made available without departing from the spirit and scope of the present invention and further that the manner of preparing these esters is not material. It will also be apparent that the products may be used in varying proportions as plasticizers or high boiling solvents to meet the demands of the specific application to which the ultimate product is to be put. These modifications are likewise contemplated within the scope of the present invention.

What I claim is:

1. An ester of beta ethyl hexyl alcohol.
2. An ester of beta ethyl hexyl alcohol and a carboxylic acid embodying an aromatic nucleus.
3. An ester of beta ethyl hexyl alcohol and a polycarboxylic acid.
4. A mixed ester of a polycarboxylic acid containing beta ethyl hexyl alcohol radical.
5. A neutral ester of beta ethyl hexyl alcohol and phthalic acid.
6. An ester of phthalic acid containing at least one beta ethyl hexyl alcohol radical.
7. An ester of beta ethyl hexyl alcohol and oxalic acid.
8. A neutral ester of beta ethyl hexyl alcohol and a carboxylic acid.

LUCAS P. KYRIDES.